United States Patent
Keller et al.

[19]

[11] Patent Number: 6,059,515
[45] Date of Patent: May 9, 2000

[54] HAND TRUCK HAVING TINES AND AN ARM FOR SEPARATING FLAKES FROM BALES OF HAY AND LIKE MATERIAL

[76] Inventors: William A. Keller; Sharon L. Keller, both of 12075 270th Ave. NE., Belgrade, Minn. 56312

[21] Appl. No.: 09/058,582

[22] Filed: Apr. 10, 1998

[51] Int. Cl.$^7$ ...................................................... B62B 1/06
[52] U.S. Cl. ......................... 414/721; 414/457; 414/490; 414/704; 280/47.131; 280/47.17; 280/47.24; 280/47.27; 280/651; 280/652; 280/654
[58] Field of Search ............... 280/47.131, 47.17–47.19, 280/47.24, 47.26, 47.27, 651, 652, 654; 414/450, 451, 457, 490, 24.5, 704, 721, 444

[56] References Cited

U.S. PATENT DOCUMENTS

| | | |
|---|---|---|
| 31,741 | 3/1861 | Humes . |
| 363,693 | 5/1887 | Spaulding . |
| 455,653 | 7/1891 | Butcher . |
| 461,522 | 10/1891 | Mead . |
| 512,915 | 1/1894 | Spaulding . |
| 605,058 | 5/1898 | Horton . |
| 1,525,444 | 2/1925 | Gignac . |
| 1,636,574 | 7/1927 | Perry . |
| 1,800,679 | 4/1931 | Day . |
| 2,814,402 | 11/1957 | Schaefer ............................... 280/47.27 |
| 3,278,061 | 10/1966 | Christensen ........................... 280/47.27 |
| 3,350,797 | 11/1967 | Dassinger et al. .................... 280/47.27 |
| 4,174,849 | 11/1979 | Wetzel . |
| 4,793,623 | 12/1988 | Talbot . |
| 5,476,356 | 12/1995 | Weiss . |
| 5,716,183 | 2/1998 | Gibson et al. . |

OTHER PUBLICATIONS

"Hay Handler Field–Test Report," Progressive Farmer, Jan. 1998, p. 24.
Dozier Equipment Co. Catalog, Jan.–Apr. 1998, p. 93.

*Primary Examiner*—J. J. Swann
*Assistant Examiner*—L. Lum
*Attorney, Agent, or Firm*—Albert W. Watkins

[57] ABSTRACT

A hand truck has a pivoting wedge that initiates a fracture within a bale of hay, straw and similar materials and assists in retaining the material onto the truck. The wedge pivots out of the way when not in use. A toe consists of long slender tines which may serve the dual purpose of sliding under and/or piercing baled material. The toe is removable from the hand truck for shipping and storage purposes. A guard rack is also provided to provide enhanced support for loose material carried by the truck and to prevent the material from getting caught up in the tires or being dragged inadvertently. According to a method of the invention, the hand truck is engaged with the bale, the wedge used to separate a flake, and then the flake is transported on the hand truck.

17 Claims, 2 Drawing Sheets

6,059,515

HAND TRUCK HAVING TINES AND AN ARM FOR SEPARATING FLAKES FROM BALES OF HAY AND LIKE MATERIAL

BACKGROUND OF THE INVENTION

1. Field of the Invention

This invention pertains generally to an apparatus for handling materials, and more specifically to a hand truck adapted to forming and handling flakes from a larger bale of material. The invention is most particularly adapted to separating and transporting flakes from large bales of hay, straw and the like.

2. Description of the Related Art

In the agricultural industry, many different crops and other materials are baled. Bales are useful not only for handling, but also for storage and transport. The formation of a bale alleviates the need for handling each individual component of the bale. Furthermore, bales are typically retained with cord, wire, string, twine or the like, which enables the source material to be compressed by large forces, thereby saving space. Furthermore, in cases where the bales are appropriately shaped, individual bales may be stacked and arranged into larger arrangements, thereby allowing very efficient storage of a large amount of material in a small space.

In the particular case of hay, prior to the introduction of balers, haystacks were a common sight across the countryside. Disadvantageously, loosely stacked hay requires very large volumes of space for storage, and the hay can present a number of hazards and difficulties. For example, hay that is not restrained may easily be swept away during strong wind gusts. Yet a barn or other storage area large enough to hold loosely packed hay is obviously not particularly economical. Furthermore, the loosely packed hay provides an ideal environment for varmints and other pests, and may provide an opportunity for rapid ignition and combustion of a material that is already too flammable. Efficiently handling loose hay or straw presents an enormous challenge, due to the relatively light weight and large volume of each particular stem or stalk. For these and a variety of other reasons, conversion to bales has proven to be much more economical for many agricultural products.

Early baling machines for hay and straw formed rectangular bales of moderate size and weight that could be handled by a person. These bales, due to their rectangular shape, were much more compact and made the processes of storage and distribution of the baled materials much simpler. For example, bales containing many times the amount of hay found in loose stacks could be arranged on a wagon during harvesting, neatly stacked into layered rows. A typical bale might be approximately one and one-half feet by two feet by three feet in size, and might weigh in the vicinity of fifty or sixty pounds. Please note, however, that both the size and weight of hay bales may be varied considerably, depending greatly upon the moisture content of the hay and the settings for the automated baler.

These small rectangular hay bales enable farmers to easily handle and feed or bed greater quantities of hay with much less effort and time, and in smaller spaces. Each bale forms a single unit structure out of thousands of stems, stalks, leaves, blades, etc. Nevertheless, each bale of this size requires manual intervention during stacking for transport, storage and distribution.

While these small rectangular bales are a vast improvement over loose hay or straw, each bale still tends to require a significant amount of manual intervention, and manual intervention translates into added labor costs. For example, loading bales onto a hay wagon has typically been a multiple person job. One person operates a tractor, while one or more additional people stack individual bales onto the wagon. Some baling machines were designed to throw the bales directly onto the wagon. Unfortunately, these machines are more complicated and prone to failure, and occasionally individual bales break during the obviously rough handling, resulting in increased losses of material.

To simplify the baling and transport process, large round balers were introduced that are able to form a single large bale five or six feet in diameter. These bales, due to their size, are typically loaded and transported with a fork lift, allowing a single person to much more quickly handle an equivalent of many single smaller bales of hay. Round bales, however, fail to provide the full stacking and storage density attained with smaller rectangular bales. Nevertheless, large round bales provided economies of scale that have proven to be very attractive to many farmers.

Even more recently, techniques have been developed for forming larger "square" bales of hay equivalent to multiples of the older rectangular bales. For the purposes of this disclosure, it will be understood that these large bales may not actually be square in construction, and could certainly be rectangular depending upon the particular design of any given machine, but nevertheless will be referred to herein as square for the sake of differentiation from the older and smaller rectangular bales. These square bales offer many advantages similar to the large round bales, such as reduced manual handling and associated labor. In addition, these bales may be tightly stacked to leave no openings therebetween, advantageously allowing the hay to be stored compactly and efficiently.

Nevertheless, during feeding and bedding, these new bales should desirably be broken down into sizes suitable for handling manually. Otherwise, the large bales are only suitable for applications where the bale may be delivered intact, such as for large central feeding stations, or where automated equipments exists to shred or otherwise handle the bales. While apparatus have been developed to assist with manual handling of a variety of materials and containers, none has been devised that would specifically assist a person with the handling of these large square bales.

U.S. Pat. No. 31,741 by Rentgen illustrates a hand truck having two short frame pieces with a curved hook which grabs the material being transported. While he discloses agricultural uses such as "sugar-hogsheads, bales of cotton, etc.," the bales for which the hand truck is designed are small round bales, and his hand truck would have no utility with large squares of material.

Wetzel in U.S. Pat. No. 4,174,849 and Talbot in U.S. Pat. No. 4,793,623 each disclose handlers using hooks to grasp and retain material, including agricultural products such as hay. The Wetzel patent is limited however, to bales of fairly specific dimension, since the carrier must be placed over the bale first and then hooked into the bale. While Talbot allows for many more diverse sizes of bales, it would be entirely impractical to attempt to handle the large square bales manually, and neither Talbot nor Wetzel make provision for both separating and transporting flakes from a bale.

U.S. Pat. Nos. 605,058 to Horton; 1,800,679 to Day; 363,693 and 512,915 to Spaulding; 461,522 to Mead; 455,653 to Butcher; and 1,525,444 to Gignac all illustrates a combination of a toe and a grasping hook in a hand truck. Nevertheless, none of these are adapted for specific and advantageous use with large squares of hay. As a result, the hooks typically extend perpendicular to the frame well beyond the toe, which allows handling of rigid loads such as boxes that may potentially be many times larger than the toe itself, but which is of disadvantage when working with large squares of hay and straw. Other references include U.S. Pat. No. 1,636,574 to Perry which shows another agricultural handler designed for loosely stacked bales; U.S. Pat. No. 5,476,356 to Weiss which shows a large mechanical bale handler; U.S. Pat. No. 5,716,183 to Gibson et al which illustrates a handler with specific features for a specific load (in this case, toilets); and the abstract of U.S. Pat. No. 5,094,581 to Lamb disclosing another large equipment handler for hay bales.

Though incorporated herein by reference for their teachings with regard to handling various materials and construction of handlers in general, none of these prior documents describes and illustrates a handler suited for handling hay or straw in the form of large square bales. For example, U.S. Pat. No. 31,741 is designed for small round bales of material which may be grasped about a perimeter thereof. This design would be of no value in the effort of extracting or handling a flake of hay from a larger bale. Therefore, a substantial need exists for apparatus which enables better manual handling of portions of larger square bales. The apparatus should desirably not offset the many advantages obtained by the economy of scale gained through the larger bale size.

SUMMARY OF THE INVENTION

In a first manifestation, the present invention comprises an apparatus for both separating a flake from a larger bale of material and also transporting the flake over a surface. The apparatus comprises a frame having a base and a top and forms a relatively planar support surface therebetween; a wheel which partially and pivotally supports the frame; a toe having at least two tines extending from the frame a first distance and serving as a material platform upon which a flake may be supported; a hook arm pivotally mounted to the frame; and a means attached to the hook arm for initiating separation of the flake from bale, whereby the separating means is of sufficient size and geometry to allow a person to separate flake from bale after sliding the toe under or into the bale and engaging the separating means with the bale, merely by rotating the apparatus relative to the surface.

In a second manifestation, the invention is a method of separating and transporting flakes from a bale to another location using a hand truck. The steps of the method include: positioning the hand truck adjacent the bale; raising a separating and retaining means above a top surface of the bale; sliding the truck toe partially under the bale; lowering the separating and retaining means into and below the top surface of the bale to engage said separating and retaining means with the bale; pivoting the hand truck; and moving the hand truck away from the bale, wherein the step of moving simultaneously separates flake from bale.

In a third manifestation, the invention pertains to a hand truck particularly adapted for handling hay, straw, and other similar agricultural material originally baled into a large square bale, having a toe extending relatively perpendicular from a frame, a handle longitudinally opposite from said toe on said frame, a wheel upon which the truck may travel when balanced by a person. The inventive improvement comprises a means attached to an upper part of the frame for pivotally wedging and dividing a top surface of said bale, wherein said wedging and dividing are sufficient to enable the truck to be pivoted and to thereby separate a flake from the bale.

OBJECTS OF THE INVENTION

A first object of the present invention is to provide an apparatus useful to an individual when manually extracting and processing small portions of material, referred to as flakes, taken from a much larger bale. A second object of the invention is to provide a simple method for extracting the flakes consistently and with minimal or no added effort. A third object of the invention is to provide a multipurpose apparatus which assists both in the extraction of a predetermined amount of material and also with the transport of the extracted material, without requiring additional equipment or expertise. A further object is to provide a multipurpose apparatus which is suitable for other applications and uses beyond handling of baled material. An additional object of the invention is to provide a small, lightweight apparatus which may be easily handled by a variety of people of diverse size and physical characteristics. Another object of the invention is to provide a handling apparatus which may be partially disassembled to a flat package for shipping and storage. These and other objects of the invention are accomplished in the preferred embodiment described hereinbelow, which is best understood when considered in conjunction with the attached drawings.

BRIEF DESCRIPTION OF THE DRAWINGS

FIG. 1 illustrates a preferred embodiment of the invention by projected view, while

DESCRIPTION OF THE PREFERRED EMBODIMENT

Figure 1:
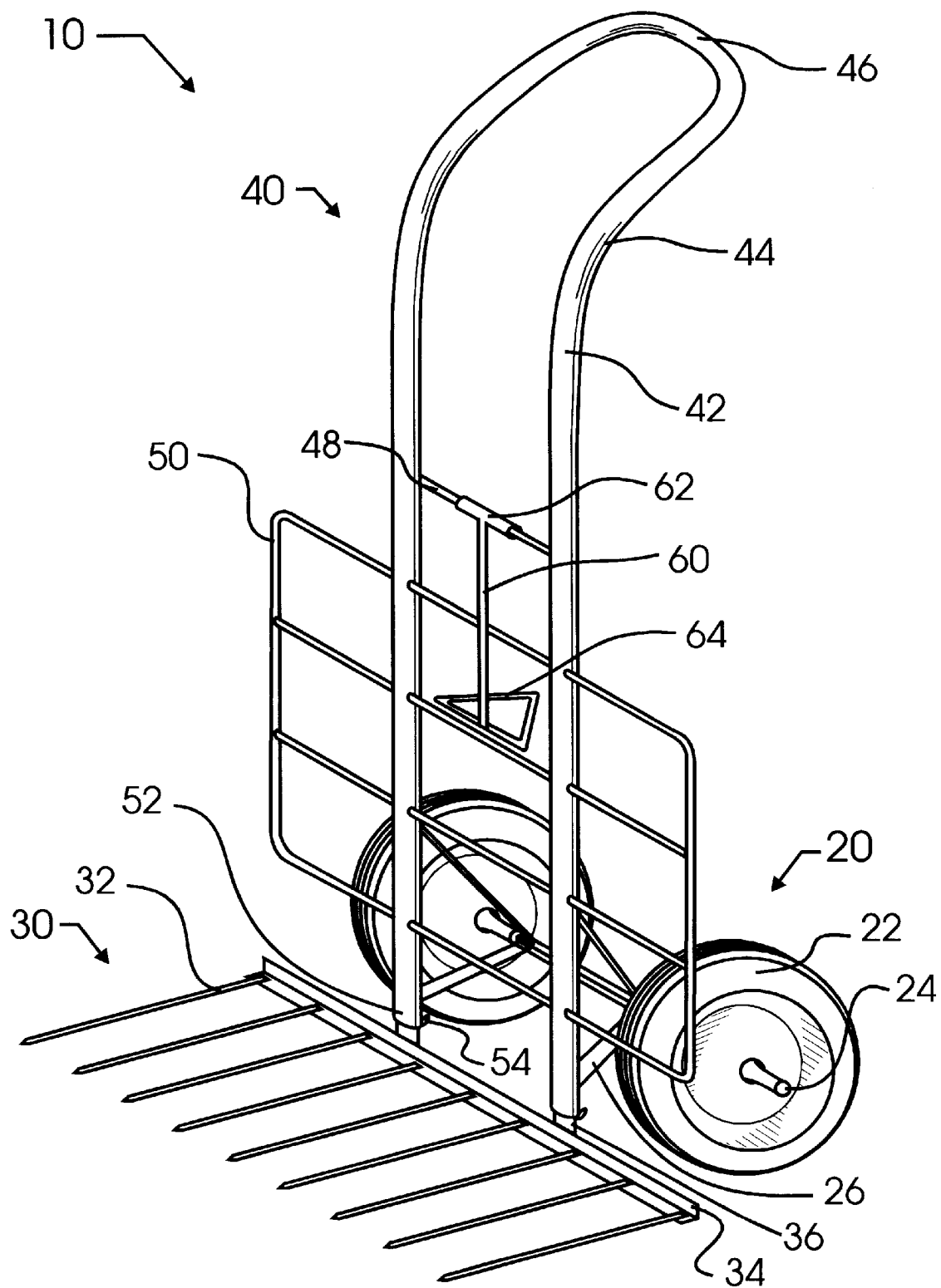

FIG. 1 illustrates by way of preferred embodiment the application of the invention to a hand truck 10. Truck 10 generally includes a wheel set 20, a toe structure 30, a frame 40 and a wedge arm 60.

Frame 40 is a generally U-shaped tube which has been bent, in addition to the U-formation, at elbow 44 to provide a convenient handle 46 which is offset from a typical vertically extending load. At the bottom end of frame 40 there is a supporting framework 50 which serves to retain softer or more pliant material and help prevent the material from sagging against the wheels 22 or dropping from truck 10. Framework 50 may be attached through, or adjacent either side of central tube sections 42. Important, however, is that framework 50 allow arm 60, discussed hereinbelow, to hang out of the way of any vertically extending load. Within bottom frame portion 52 is a hole which allows a small hand screw 54 to be inserted and threaded therein. This may be accomplished by directly threading the tube or more preferably welding a small nut on the exterior thereof. As hand screw 54 is threaded therein, it may engage with a similar hole in upright smaller diameter tubes 36, which allows toe 30 to be releasably attached to frame 40. The tubing of the preferred embodiment may be, for example, schedule 40 one-inch i.d. pipe.

Adjacent tube 36 is a small angle iron 34 which serves as the platform upon which tines 32 may be supported. These tines 32 form a generally elongate, almost spear like structure, which adapts the hand truck well to materials which may be pierced and which might otherwise be difficult to slide under. Among these materials, of course, is hay and straw. Tines 32 may be directly welded onto iron 34 in the preferred embodiment, or other methods of attachment that are known may be provided which would enable these tines to be removed. Occasionally, through mishap, a tine may be broken and will need replaced. Removal and rewelding is a fairly simple process, though other methods, as aforementioned, are contemplated herein. The material for the tines is preferred to be slightly harder than for the rest of the hand truck, though this feature will depend somewhat upon the application and the needs of a designer. Too hard a material tends to become brittle and may be broken more easily, while too soft a material will be unable to carry the full load ratings and stand up to typical usage. It will be understood that the preferred shapes for tines 32 and frame 40 illustrated herein are round, but may also be rectangular, square, or, in the case of frame 40, even solid, though tubular steel is preferred for frame 40 for weight, strength and ease of manufacturing. As an alternative to tines 32, a typical solid platform toe may be provided, and thereby replace the function of tines 32. However, for hay and straw, tines 32 are preferred. As a further alternative, a plate may be provided which removably covers the tines and which can either be removed or displaced mechanically through a rotation to cover framework 50. Tines 32 are preferably spaced at the end adjacent frame 40 slightly above the ground surface 90, while the distal end of tines 32 are touching the ground. This orientation ensures that when truck 10 is standing upright, tines 32 are sliding along surface 90 to readily drive underneath material such as bale 80.

Wheel set 20 includes wheels 22, which are preferably of the pneumatic variety to allow more convenient load transport over uneven or irregular surfaces, axle 24 upon which wheels 22 are mounted, and triangular straps 26 which serve to anchor wheel set 20 to frame 40. The triangular design of straps 26 is preferred since there are numerous occasions where force may be necessary to slide structure 30 underneath a bale or other load. This will typically be done by an operator kicking against axle 24, and so both straps 26 and axle 24 must be designed to withstand the force of the operator kick. In addition, straps 26 offset wheels 22 away from the load carrying surfaces of truck 10. In the preferred embodiment, axle 24 will preferably be formed from an angle iron to provide additional strength, and may have rods welded at each end onto which tires 22 are mounted. In the preferred embodiment, toe 30 and wheels 22 may be designed to fit through typical 32" or 36" doorways.

Between handle 46 and toe 30 is a small pivotal arm 60 which has a triangular wedge 64 supported thereon. This wedge 64 serves to separate and retain flakes from large bales, as will be described in more detail hereinbelow. More specifically, arm 60 pivots on a frame rod 48 through a slightly larger diameter tube 62. This method of attachment is preferred strictly due to simplicity and cost, and it will be understood that many other alternatives are available for the pivotal attachment, and that the exact angle of rotation is not critical. Furthermore, mechanical levers may be configured which do not directly pivot, but which otherwise perform the necessary function of lowering down a severing device such as wedge 64 into the bale.

Additionally, the exact geometry and composition of wedge 64 is also not critical. Wedge 64 may be comprised of many tines similar to tines 32, may be sharp, etc., but the triangular design is preferred. Noteworthy is the fact that wedge 64 should be of sufficient dimension to initiate the fracture between flake 70 and bale 80, but this benefit must be weighed against the size presenting to the back towards the human operator when wedge 64 is not being used, as shown in FIG. 1. Prior art load grasping devices are designed to be small sharp devices which would not readily benefit the present invention, since they would not assist in the initial severing of the flake from the bale. Others of those devices designed for hay are of the hay hook variety which penetrate and actually retain the bale in one contiguous piece, as opposed to the severing of the present invention. The triangular design, with dimension of approximately nine inches on a side, has been found to provide optimum severing while not presenting too much towards the operator when in the non-use position illustrated in FIG. 1. In addition, the triangular design with open center holds hay and straw well.

Figure 2:
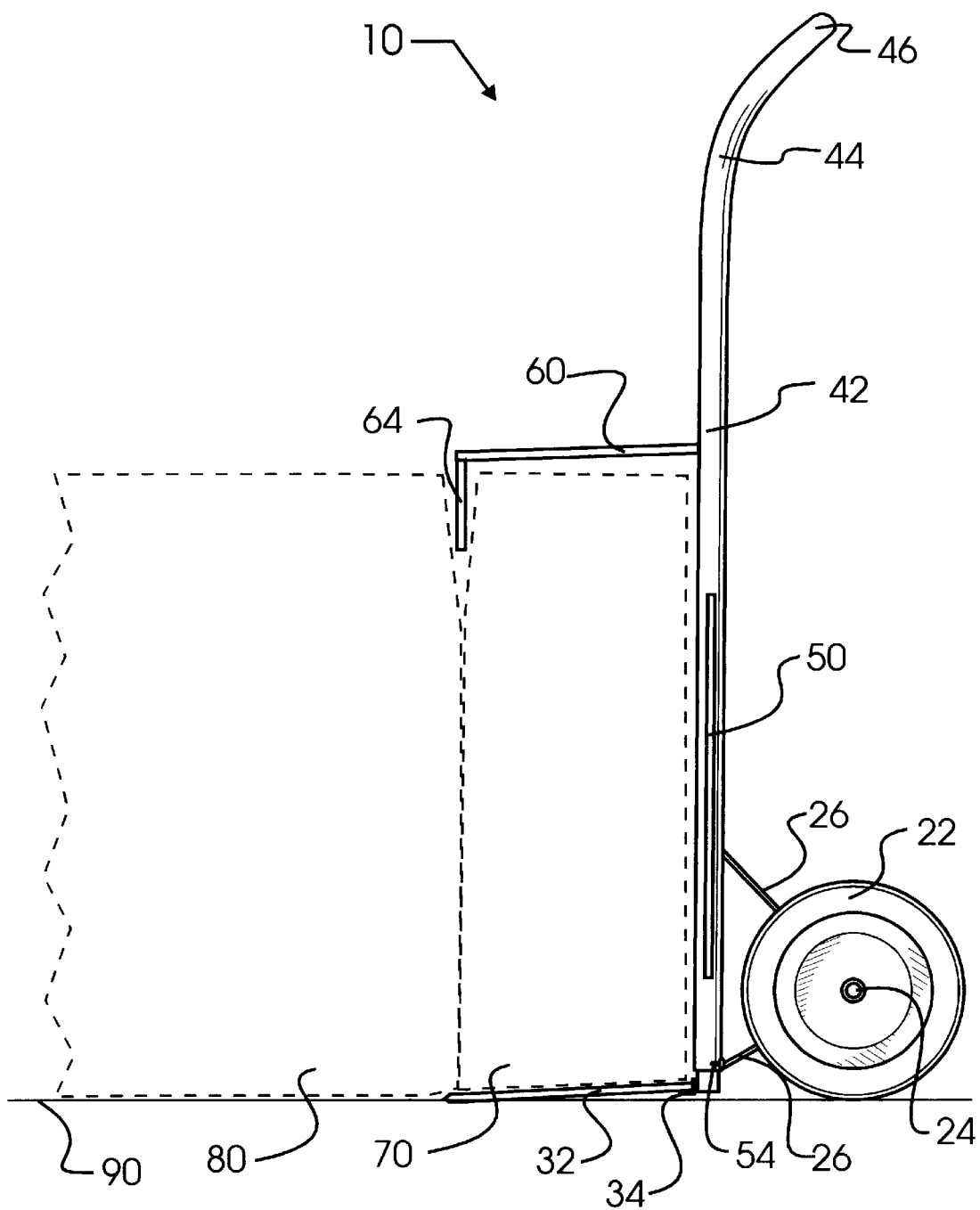
FIG. 2 illustrates the preferred embodiment of FIG. 1 from a side view.

As best seen from FIG. 2, which further includes a flake 70, large square bale 80 and ground surface 90, toe structure 30 including tines 32 is slid under bale 80. Arm 60 is at first held up and above bale 80, but is next pivoted down onto bale 80 to initiate a divide between flake 70 and bale 80. Next, handle 46 is tilted away from bale 80, which leads to flake 70 being extracted from bale 80 while still being carried upon tines 32. As is apparent, the flake 70 that is removed may still be fairly massive, and may for example still be the equivalent of several of the smaller rectangular bales. Nevertheless, truck 10 provides a well balanced support structure which enables flake 70 to be transported with a minimum of effort.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, the utility of the present invention extends beyond hay and straw, and the preferred embodiment has been used with many other materials. For example, drums, crates, boxes and other general packaging may be transported in the standard way. As aforementioned, various platforms may be provided on to or instead of tines 32 to enable handling different loads, and these do not detract from the general utility of the present invention. The tines have been found to have particular utility with hay and straw and other similar material, but even in transporting newborn calves the preferred embodiment has found utility. The scope of the invention is set forth and particularly described in the claims hereinbelow.

I claim:

1. An apparatus for both separating a flake having a top surface and a bottom surface from a bale of loosely aggregated material and also transporting said flake over a surface, comprising:

a frame having a base, a top portion spaced from said base in a first direction and a support surface therebetween for said flake;

a plurality of wheels which partially and pivotally support said frame relative to said surface;

a toe at said base extending from said frame a first distance measured perpendicular to said first direction and serving as a material platform upon which said flake bottom surface is primarily supported during said transporting;

a hook arm mounted to and pivotal about said frame at a first end thereof;

a means attached to said hook arm opposite said first end for initiating separation of said flake from said bale, whereby said separating means is of size and geometry to allow a person to separate said flake from said bale, after sliding said toe under or into said hale and engaging said separating means with said bale.

2. The apparatus of claim 1 wherein said hook arm operatively extends from said frame a second distance measured perpendicular to said first direction, whereby said flake, once separated from said bale using said operatively extended hook arm, is supported by said toe.

3. The apparatus of claim 2 wherein said hook arm is pivotable down into said bale to initiate said separating.

4. The apparatus of claim 1 further comprising a handle graspable by a human operator on said frame at said top portion.

5. The apparatus of claim 1 wherein said toe has at least two tines of elongated narrow geometry extending perpendicular to said first direction.

6. The apparatus of claim 1 wherein said toe has at least two lines of elongated narrow geometry and forms an obtuse angle with said first direction.

7. The apparatus of claim 6 wherein an end of said tines distal to said frame touch said surface and balance said frame in an upright position in association with said wheels, while an end of said tines adjacent to said frame are spaced from said surface.

8. The apparatus of claim 1 wherein said toe is detachable and engageable with said frame.

9. The apparatus of claim 8 wherein said frame and said toe engage coaxially.

10. The apparatus of claim 9 wherein said frame is tubular.

11. The apparatus of claim 7 wherein said tines are detachable.

12. The apparatus of claim 1 further comprising a means for preventing said flake from interfering with rotation of said wheels.

13. A method of separating and transporting flakes from a bale of loosely aggregated material to another location using an improved hand truck having an integral separating and retaining means, comprising the steps of:

positioning said hand truck adjacent said bale;

sliding raising said separating and retaining means above a top surface of said bale a toe of said hand truck under a bottom surface of said bale;

initiating a separation of a flake from said bale by lowering said separating and retaining means into and below said top surface to thereby engage said separating and retaining means with said bale;

pivoting said hand truck; and moving said hand truck in entirety away from said bale to said another location, wherein said moving simultaneously separates said flake from said bale.

14. The method of claim 13 comprising the additional steps of:

elevating said separating and retaining means from said flake; and removing said flake from said hand truck.

15. The method of claim 13 wherein lowering is accomplished by dropping said separating and retaining means from said raised position pivotally to impact with said bale.

16. A hand truck particularly adapted for handling a multitude of discrete, separable materials originally assembled into a bale, having a toe extending primarily perpendicular from a frame to a toe end, a handle distal from said toe on said frame, a plurality of wheels upon which said hand truck may travel when balanced by a person, wherein the improvement comprises a means attached to an upper part of said frame for pivotally wedging and dividing a top surface of said bale, wherein said wedging and dividing means, responsive to a pivoting of said hand truck, separates a flake of said separable material from said bale and retains said flake between said wedging and dividing means, said frame and said toe.

17. The method of claim 13 wherein said toe is removable from said improved hand truck.

* * * * *